United States Patent [19]
Gryaznov et al.

[11] 3,876,555
[45] Apr. 8, 1975

[54] MEMBRANE CATALYSTS FOR CARRYING OUT SIMULTANEOUS PROCESSES INVOLVING EVOLUTION AND CONSUMPTION OF HYDROGEN

[76] Inventors: Vladimir Mikhailovich Gryaznov, Leninskie Gory, MGU, korpus A, kv. 11; Viktor Sergeevich Smirnov, Kutuzovsky prospect, 26, kv. 555; Alexander Petrovich Mischenko, Khersonskaya ulitsa, 7, korpus 4, kv. 115, all of Moscow, U.S.S.R.

[22] Filed: May 16, 1973

[21] Appl. No.: 360,943

Related U.S. Application Data

[63] Continuation of Ser. No. 322,974, Jan. 12, 1973, abandoned, which is a continuation of Ser. No. 741,335, July 1, 1968, abandoned.

[52] U.S. Cl. ............... 252/432; 252/472; 252/474; 252/477 R
[51] Int. Cl. ..................... B01j 11/08; B01j 11/22
[58] Field of Search ........ 252/472, 474, 477 R, 432; 55/16

[56] References Cited
UNITED STATES PATENTS

| | | |
|---|---|---|
| 2,824,620 | 2/1958 | DeRosset .............................. 183/2 |
| 3,155,467 | 11/1964 | Yamamoto et al. .................... 55/16 |
| 3,428,476 | 2/1969 | Langley et al. ...................... 117/62 |
| 3,439,474 | 4/1969 | McKinley .............................. 55/16 |

Primary Examiner—Winston A. Douglas
Assistant Examiner—W. J. Shine

[57] ABSTRACT

A membrane catalyst for carrying out simultaneous processes involving evolution and consumption of hydrogen, which membrane catalyst is in the form of a cellular foil made of an alloy of palladium and at least one other element selected from the elements in group VIII of the Periodic System other than palladium, gold, copper, or boron, the foil having oppositely directed alternate projections of hemispherical or half-ellipsoidal shapes, the ratio of the projection height to the foil thickness being within the range from 10 to 200:1. If more than one foil membrane is used in the process, the foils are positioned parallel to one another so that the projections of one foil oppose the projections of the neighboring one. A gap must be provided between the foils to allow the passage of the starting material and the discharge of the reaction products.

4 Claims, 3 Drawing Figures

3,876,555

MEMBRANE CATALYSTS FOR CARRYING OUT SIMULTANEOUS PROCESSES INVOLVING EVOLUTION AND CONSUMPTION OF HYDROGEN

This application is a continuation in part of copending application Ser. No. 322,974 filed Jan. 12, 1973 (now abandoned) which in turn is a continuation of Ser. No. 741,335, filed July 1, 1968 (now abandoned).

This invention relates to the processing of petroleum hydrocarbons and natural gases, and more particularly to membrane catalysts for simultaneous processes involving evolution and consumption of hydrogen.

The membrane of the invention can be used in reactors for carrying out conjugated processes of dehydrogenation, dehydrocyclization, hydrogenation and hydrodealkylation in the production of monomers for synthetic materials and medicinal preparations.

Known in the prior art are catalysts which are selectively permeable to hydrogen in the form of fine tubes of palladium or its alloys with silver for carrying out simultaneous processes involving evolution and consumption of hydrogen in which hydrogen is released at one surface of the tube, diffuses to the other side of the tube and enters into the hydrogen addition reaction thereat. This involves much soldering work, and moreover, the surface upon which the conjugated process take place is not sufficiently large per unit volume of the reactor. Furthermore, both reaction spaces thus formed are not identical to each other with respect to the hydrodynamics of the process.

An object of the invention is to provide an alloy possessing catalytic activity and selective permeability for hydrogen with a shape that will ensure carrying out simultaneously, on different sides of the membrane, the reactions of olefin dehydrogenation, hydrodealkylation of alkylaromatic hydrocarbons, and other processes involving evolution and consumption of hydrogen in similar conditions.

The above and other objects have been attained in a membrane catalyst for simultaneously carrying out processes involving evoltion and consumption of hydrogen which comprises a cellular foil made of an alloy of palladium with an element selected from the group consisting of at least one of the other elements of group VIII of the Periodic System, gold, copper and boron, said alloy containing palladium in an amount from 5 to 98 per cent, and having oppositely directed alternating projections arranged in rows, the ratio of the projection height to the foil thickness being within the range of from 10 to 200:1. The projections can have the shapes of hemispheres, the distance between the projection centers being equal to two diameters of the hemispheres. The projections can also be of half-ellipsoid shape, the main axes of which are arranged to one another at angles from 30° to 90°. Several cellular foils can be arranged in a set, which is placed in a reactor for simultaneously carrying out two chemical processes conjugated by the transfer of hydrogen through the foil. The foils in such sets are so arranged with respect to one another that the projections of one foil oppose the projections of the neighboring one and a gap is provided between them to allow passage of the starting material and reaction products.

The membrane catalyst, made of a palladium alloy possessing catalytic activity with respect to reactions involving evolution and consumption of hydrogen and capable of selective transfer of hydrogen from the reaction zone where hydrogen is formed to the zone where it is consumed, ensures uniform washing of the foil surfaces with the reactants and prevents the formation of stagnation zones. This in turn ensures more efficient utilization of the catalytic surfaces of the membrane and moreover, makes it possible to carry out both conjugated processes in identical hydrodynamic conditions, and finally to increase th yield of the end products.

In the attached drawing showing several embodiments of membranes according to the invention:

Figure 1:
FIG. 1 is a perspective view of a cellular membrane catalyst taken in partial section through pressed out projections of hemispherical shapes.

Referring to FIG. 1 therein is shown a cellular membrance with two sets of projections 1 and 2 extending in opposite direction and of hemispherical shape.

Figure 2:
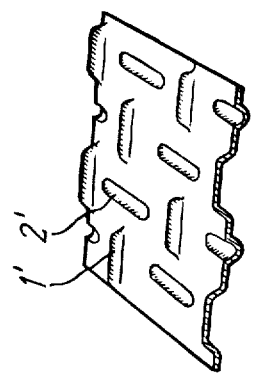
FIG. 2 shows a cellular membrane catalyst with halfellipsoid projections and depressions, the main axes of which are arranged at right angles to each other.

FIG. 2 shows alternate projections 1' and hollws 2' of ellipsoidal shape whose axes are at right anlges to one another.

These configurations serve to ensure uniform washing of the membrane catalyst with the reaction components in order to prevent the formation of stagnation zones in which carbonaceous substances can be deposited, and moreover, the uniform contact of the reaction components with the projection surfaces serves to ensure the participation of the entire surface of the foil in the catalytic conversion of hydrocarbons.

Figure 3:
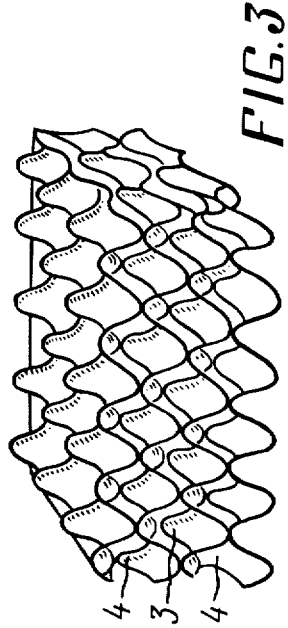
FIG. 3 shows a set of foils with hemispherical projections.

The arranged cellular foils in FIG. 3 form spaces 3 and 4. A substance which reacts and releases hydrogen is delivered into space 3, while a substance combining with the hydrogen passed through the foil from space 3 is delivered into space 4. To prevent a close fit between the neighboring foils due to pressure drops in spaces 3 and 4, the foils are so arranged that the projections of one foil oppose the projections of the neighboring one, as shown in FIG. 3.

For a better understanding of the invention, examples of utilization of foils in conversion of some hydrocarbons are given below by way of illustration.

EXAMPLE 1

Dehydrogenation of trans-butene-2

A cellular foil, 0.1 mm thick, having hemispherical projections 2 mm high and made of a palladium alloy containing 5.5 per cent nickel, is used as the membrane catalyst. Transbutene-2 is fed into the reactor at a partial pressure of 10 mm Hg in a flow of argon. The reaction products are analyzed on a chromatograph. At a temperature of 410°C, the quantity of the formed butadiene -1,3 is 7.3 per cent by volume. The isomerization of the starting trans-butene-2 that takes place proceeds with the formation of 25.5 per cent of butene-2 and 12.3 butene-1; the reaction products contain also up to 11 per cent of butane. No splitting products are found in the reaction mixture.

EXAMPLE 2

Hydrodealkylation of toluene

A cellular foil, 0.1 mm thick, having 1.5 mm high hemispherical projections, made of a palladium alloy with 10 per cent of rhodium, is used as the membrane catalyst. Toluene is delivered into the reaction vessel at a partial pressure of 42 mm Hg in a current of argon. The yield of benzene at a temperature of 485°C is 92 per cent by weight.

EXAMPLE 3

Hydrodealkylation of xylenes and ethylbenzene

Hydrodealkylation of xylenes and ethylbenzene is effected on a membrane catalyst of a palladium alloy, manufactured in the form of cellular foils with 1 mm high half-ellipsoidal projections, at a temperature of 550°C and a partial pressure of the starting hydrocarbons of 40 mm Hg. The foil is 0.1 mm thick.

The yield of benzene and toluene from o-xylene in the process on a catalyst made of palladium and 10 per cent of rhodium, is 2.6 per cent and 3.5 per cent respectively; the yield with p-xylene is 0.8 and 5.8 per cent and with m-xylene 2.4 and 7.8 per cent respectively. Ethylbenzene processed on the same catalyst is converted into 11.4 per cent of benzene and 9.4 per cent of toluene.

The yield of benzene and toluene in the process on a palladium catalyst containing 5.5 per cent of nickel is 4.3 and 8.0 per cent respectively. The starting material is ethylbenzene. The conditions of the process are identical.

Similar results were obtained also with a foil made of an alloy of palladium and ruthenium.

EXAMPLE 4

Dehydrogenation of isoamylene with hydrodealkylation of toluene

Isomylene vapor at a pressure 10 mm Hg is delivered in a current of argon into one zone of a reactor heated to 450°C in which a set comprising 21 cellular foils with hemispherical projections made of an alloy of palladium with 5.5 per cent of nickel is installed. Toluene vapor is delivered at a pressure of 40 mm Hg into the second zone of the reacter. Up to 16–20 per cent of isoprene are formed in the reaction zone 1. Hydrogen that is liberated in the dehydrogenation process diffuses through the foil into zone 2 where it reacts with toluene. The yield of benzene is 12 per cent.

We claim:

1. A membrane catalyst for simultaneously carrying out processes involving evolution and consumption of hydrogen, said membrane catalyst comprising a cellular foil made of an alloy of palladium with one element selected from the group consisting of group VIII element of the Periodic System other than palladium, gold, copper and boron, the palladium content being from 5 to 98 per cent, said foil including alternating projections at the surface extending in opposite direction and arranged in rows, the ratio of the height of the projections to the thickness of the foil being within the range of from 10 to 200:1.

2. A membrane catalyst as claimed in claim 1 wherein said projections are hemispherical in shape, the distance between the centers of one alternating set of projections being at least equal to 2 diameters of the hemispheres.

3. A membrane catalyst as claimed in claim 1 wherein said projections are half-ellipsoidal in shape, one alternating set of projections having main axes which are arranged at angles from 30° to 90° with respect to the other set of alternating projections.

4. A membrane catalyst for simultaneously carrying out processing involving evolution and consumption of hydrogen, said membrane catalyst consisting of at least two cellular foils, each made of an alloy of palladium with one element selected from the group consisting of group VIII element of the Periodic System other than palladium, gold, copper and boron, the palladium content being from 5 to 98 per cent, each said foil having alternating and oppositely directed projections arranged in rows, the ratio of the height of the projections to the foil thickness being within the range of from 10 to 200:1, said foils being arranged so that the projections of one foil oppose the projections of the neighboring one, and a gap is defined between the foils for passage of the starting material and discharge of the reaction products.

* * * * *